May 29, 1923.
G. J. THOMAS
BRAKE
Filed Jan. 20, 1922
1,457,048
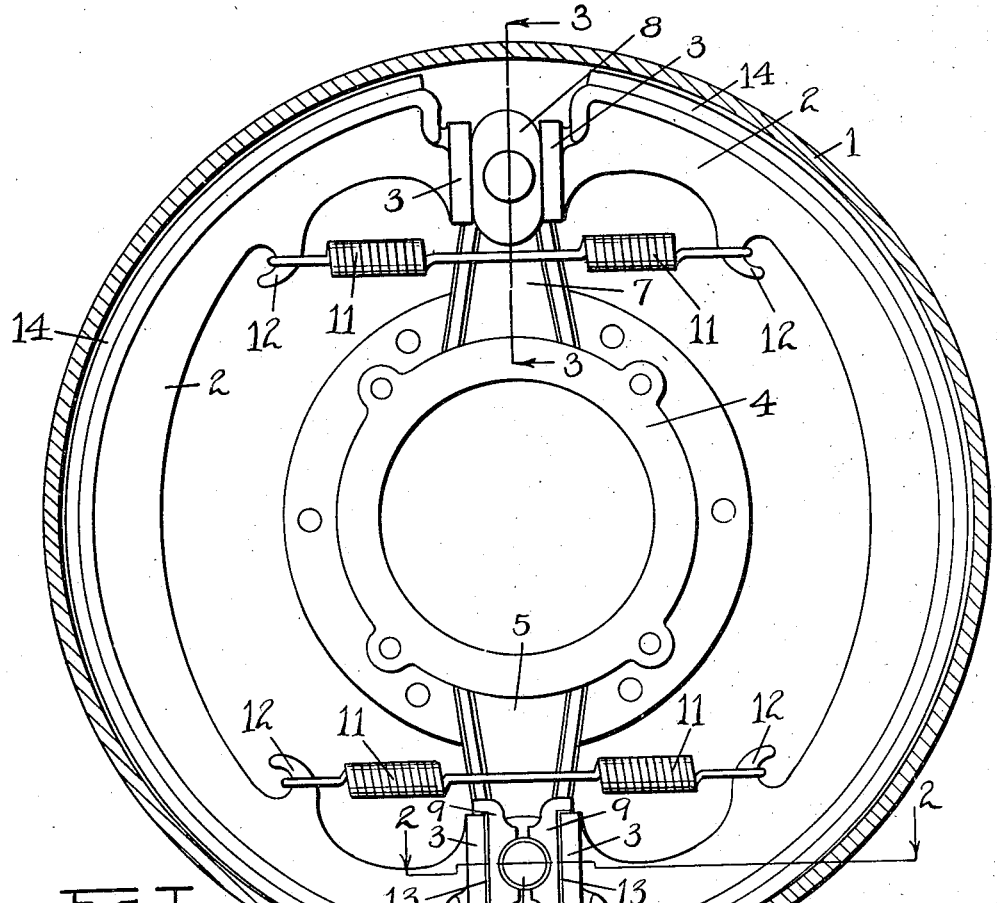
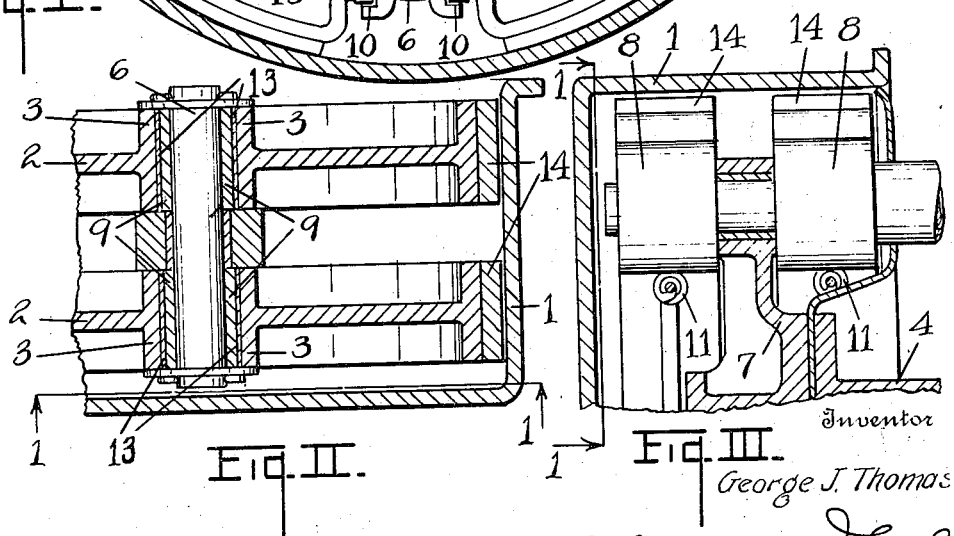
Inventor
George J. Thomas
Chappell & Earl
Attorneys Patented May 29, 1923.

1,457,048

UNITED STATES PATENT OFFICE.

GEORGE J. THOMAS, OF LANSING, MICHIGAN.

BRAKE.

Application filed January 20, 1922. Serial No. 530,541.

*To all whom it may concern:*

Be it known that I, GEORGE J. THOMAS, a citizen of the United States, residing at Lansing, county of Ingham, State of Michigan, have invented certain new and useful Improvements in Brakes, of which the following is a specification.

This invention relates to improvements in brakes.

The main objects of the invention are:

First, to provide an improved brake for motor vehicles and the like in which the brake shoes are arranged and supported so that they contact substantially throughout their entire periphery when the brake is set.

Second, to provide an improved brake in which the shoes may be quickly and easily adjusted to compensate for wear.

Third, to provide an improved brake in which the parts are simple and economical in structure and easily assembled.

Further objects, and objects relating to structural details, will definitely appear from the detailed description to follow.

I accomplish the objects of my invention by the devices and means described in the following specification. The invention is clearly described and pointed out in the claims.

A structure which is a preferred embodiment of my invention is clearly illustrated in the accompanying drawing, forming a part of this application, in which:

Fig. I is a vertical section through the drum of a brake embodying the features of my invention on a line corresponding to line 1—1 of Figs. II and III.

Fig. II is a detail section on a line corresponding to line 2—2 of Fig. I.

Fig. III is a detail section on a line corresponding to line 3—3 of Fig. I.

In the drawing similar reference characters refer to similar parts throughout the several views, and the sectional views are taken looking in the direction of the little arrows at the ends of the section lines.

Referring to the drawings, 1 represents the drum of a brake embodying my improvements as I have embodied them for motor vehicles.

The brake shoes 2 are of segmental shape and provided with block-like rests 3 at each end, the shoes being duplicates and their ends being of uniform shape so that the shoes may be interchanged or reversed.

The supporting spider, designated generally by the numeral 4, is provided with an arm 5 carrying the pin 6 and with an opposed arm 7 carrying the actuating cam 8. On this pin 6 are pivot blocks 9 disposed to face oppositely and having recess-like seats 10 for the rests 3 at one end of the shoes. The rests at the other end of the shoes bear against the actuating cam 8, as illustrated. The pin is arranged so that the shoes are eccentrically supported within the drum, the advantage of this being that when the brake is set the shoes contact substantially throughout their periphery or their entire clutching surface.

The shoes are held in position by the springs 11 which are engaged with hooks 12 on inner sides of the shoes, there being a spring connection for the shoes at both ends so that they are yieldingly held in their seats and against the actuating cam.

I have illustrated in Fig. II a shim 13 which may be arranged in the seat of the pivot block to take up wear. These may be introduced or removed as occasion may require. For instance, as the facings 14 of the shoes wear away the shims may be introduced to compensate for such wear. When new facings are applied the shims would not be required. This makes it possible to easily maintain the brake in effective condition as the shims may be introduced without disassembling the parts, it only being necessary to force out the shoes against the tension of the springs and slip the shims into the seat of the pivot block. When it is desired to disassemble the parts the shoes may be removed without removing bolts or the like other than such as may be necessary to afford access to the shoes.

Having thus described my invention, what I claim as new and desire to secure by Letters Patent, is:

1. The combination of a drum, a pair of segmental shoes having block-like rests at each end, said shoes being duplicates and of uniform shape at both ends so that they may be interchanged and reversed, a spider provided with projecting arms, one of which carries a pin and the other an actuating cam, oppositely facing pivot blocks mounted on said pin and having recess-like seats adapted to receive the rests at one end of said shoes with the rests at the other end coacting with said actuating cam, and springs connecting the ends of said shoes whereby they are yieldingly held upon their pivot blocks and against said actuating cam.

2. The combination of a drum, segmental shoes having rests at each end, a shoe supporting pin, an actuating cam, pivot blocks mounted on said pin and having seats adapted to receive the rests at one end of said shoes with the rests at the other end coacting with said actuating cam, and springs connecting the ends of said shoes whereby they are yieldingly held upon their pivot blocks and against said actuating cam.

In witness whereof, I have hereunto set my hand and seal in the presence of two witnesses.

GEORGE J. THOMAS. [L. S.]

Witnesses:
 JAS. W. PARMELEE,
 ANDREW LANGENBACHER.